(12) United States Patent
Rumbolt et al.

(10) Patent No.: US 10,250,347 B1
(45) Date of Patent: Apr. 2, 2019

(54) ROUTING-EFFICIENT TIME DIVISION MULTIPLEXING (TDM) DATA PATH CIRCUITRY

(71) Applicant: ALTERA CORPORATION, San Jose, CA (US)

(72) Inventors: Chuck Rumbolt, St. John's (CA); Stephen Craig, St. John's (CA)

(73) Assignee: ALTERA CORPORATION, San Jose, CA (US)

( * ) Notice: Subject to any disclaimer, the term of this patent is extended or adjusted under 35 U.S.C. 154(b) by 226 days.

(21) Appl. No.: 15/201,052

(22) Filed: Jul. 1, 2016

(51) Int. Cl.
*H04J 3/02* (2006.01)
*H04J 3/16* (2006.01)
*H04J 14/02* (2006.01)

(52) U.S. Cl.
CPC .............. *H04J 3/02* (2013.01); *H04J 3/1694* (2013.01); *H04J 14/0201* (2013.01)

(58) Field of Classification Search
CPC ........ H04J 3/02; H04J 3/1694; H04J 14/0201; H04J 14/0263; H04J 14/0265; H04L 5/00; H04L 12/5601
See application file for complete search history.

(56) References Cited

U.S. PATENT DOCUMENTS

| RE36,716 E | * | 5/2000 | Kozaki | ............... | H04L 12/5601 |
| | | | | | 370/392 |
| 9,025,594 B1 | * | 5/2015 | Mok | ................... | H04J 14/0201 |
| | | | | | 370/369 |
| 2008/0107188 A1 | * | 5/2008 | Kennedy | .............. | H04B 1/7163 |
| | | | | | 375/259 |

* cited by examiner

*Primary Examiner* — Khoa Huynh
(74) *Attorney, Agent, or Firm* — Fletcher Yoder, P.C.

(57) ABSTRACT

TDM circuitry that includes a rotary multiplexer and a memory circuit is provided. A first rotary multiplexer circuit may receive N-bit wide data in accordance to a time division multiple access (TDMA) scheme. The N-bit wide data includes multiple sets of M-bit wide data. The first rotary multiplexer may rotate these sets of the M-bit wide data. The memory circuit is coupled to the first rotary multiplexer circuit. The memory circuit stores each of rotated set of M-bit wide data. A second rotary multiplexer circuit may read k-th bits of the each of the stored M-bit wide data from the memory circuit and may rotate these k-th bits before outputting these k-th bits serially, where k is an integer having a value greater than 0.

20 Claims, 5 Drawing Sheets

ROUTING-EFFICIENT TIME DIVISION MULTIPLEXING (TDM) DATA PATH CIRCUITRY

BACKGROUND

This disclosure relates to efficient time division multiplexing circuitry for an integrated circuit.

This section is intended to introduce the reader to various aspects of art that may be related to various aspects of these techniques, which are described and/or claimed below. This discussion is believed to be helpful in providing the reader with background information to facilitate a better understanding of the various aspects of this disclosure. Accordingly, it should be understood that these statements are to be read in this light, and not as admissions of prior art.

High-speed interconnectivity has become increasingly used in the modern era. One of the ways to achieve the high-speed interconnectivity is to use an optical fiber communication (OFC). An optical fiber communication generally includes multiple integrated circuit devices such as a data aggregation device, a switching device, a multiplexing device, etc. A data aggregation device aggregates client data received from external circuits (i.e., client devices) that are connected to the data aggregation device. One of the circuits within the data aggregation device is time domain multiplexing (TDM) data path circuitry. The TDM data path circuitry de-merges (i.e., demultiplexes) a wide data into a small-sized data so that it could be processed by a processor circuit (which may also be part of the data aggregation device). For example, the TDM data path circuitry may de-merge a 320-bit wide data into ten 32-bit wide data, whereby each 32-bit wide data may then be processed by the processor circuit.

The TDM data path circuitry may generally include a memory circuit and a gearbox circuit. Data links, which form input terminals for the TDM data path circuitry, receives the client data. The data links, however, may be coupled directly to memory elements within the memory circuit. As the width of the client data increases, number of routings to the memory elements within the memory circuit also increases. For example, client data of 320-bit wide may be stored in the memory elements may require at least 3200 (i.e., 320×10) routings.

SUMMARY

Embodiments described herein include routing efficient time division multiplexing (TDM) circuitry. It should be appreciated that the embodiments can be implemented in numerous ways, such as a process, an apparatus, a system, a device, or a method. Several embodiments are described below.

In one embodiment, TDM circuitry includes first and second rotary multiplexers and a memory circuit. The first rotary multiplexer circuit receives an N-bit wide data in accordance to a time division multiple access (TDMA). The N-bit wide data includes multiple sets of M-bit wide data. The first rotary multiplexer may rotate these sets of the M-bit wide data. The memory circuit is coupled to the first rotary multiplexer circuit. The memory circuit stores each of rotated set of M-bit wide data. The second rotary multiplexer circuit reads k-th bits of the each of the stored M-bit wide data from the memory circuit and rotates these k-th bits before outputting these k-th bits serially, whereby k is an integer having a value greater than 0.

In another embodiment, an integrated circuit device includes a plurality of transceiver circuits and TDM circuitry. The plurality of transceiver circuits may receive data from external integrated circuit device and generates an N-bit wide data that is transmitted in accordance to the time division multiple accesses (TDMA). The TDM circuitry receives the N-bit wide data in parallel and outputs M-bit wide data serially. The TDM circuitry includes approximately 4 N routings.

In yet another embodiment, a method of operating TDM circuitry includes a receiving an N-bit wide data in parallel from one or more transceiver circuits. The TDM circuitry, having a first rotary multiplexer circuit, separates the N-bit wide data into sets of M-bit wide data and rotates each of these sets of M-bit wide data. M may have a value that is smaller than a value of N. The method also includes storing the set of M-bit wide data onto a memory circuit after rotating them. The method also includes reading k-th bits of the stored M-bit wide data from the memory circuit using a second rotary multiplexer circuit. The set of k-th bits may then be rotated before being output from the second rotary multiplexer circuit.

Further features of the disclosure, its nature and various advantages will be more apparent from the accompanying drawings and the following detailed description of the preferred embodiments.

DETAILED DESCRIPTION

The following embodiments include routing efficient time division multiplexing (TDM) circuitry. It will be obvious, to one skilled in the art, that the present embodiments may be practiced without some or all of these specific details. In other instances, well-known operations have not been described in detail in order not to unnecessarily obscure the present embodiments.

Throughout this specification, when an element is referred to as being "connected" or "coupled" to another element, it may be directly connected or coupled to the other element or electrically connected or coupled to the other element with yet another element interposed between them.

Figure 1:
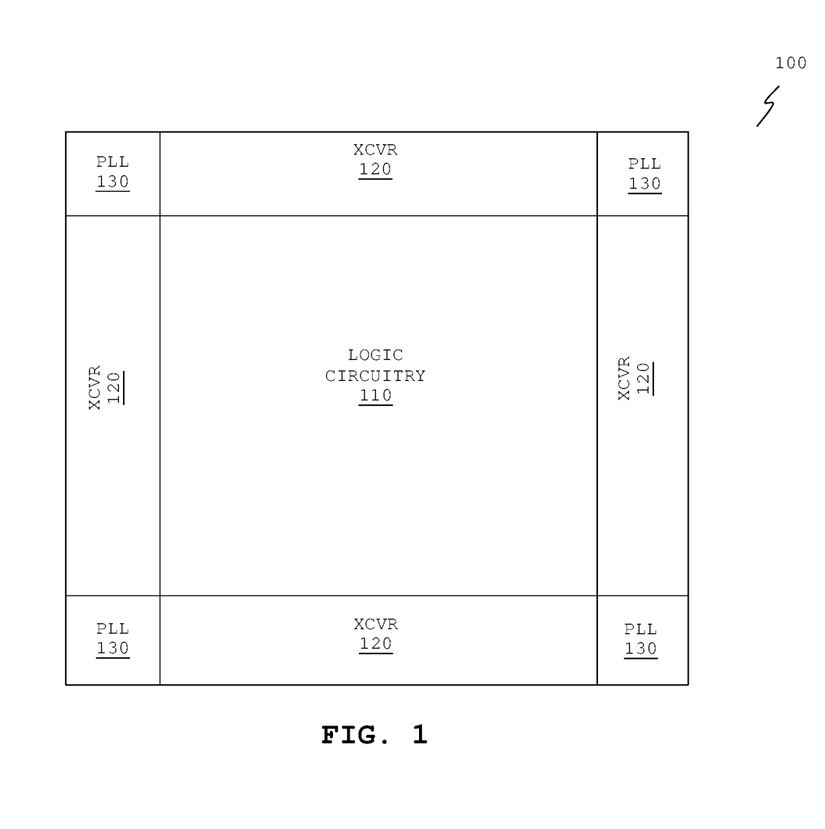
FIG. 1 shows an illustrative integrated circuit device having time division multiplexing (TDM) circuitry in accordance with one embodiment of present disclosure.

FIG. 1, meant to be illustrative and not limiting, illustrates an integrated circuit device in accordance with one embodiment of present disclosure. Integrated circuit device 100 includes logic circuitry 110, multiple transceiver circuits (XVCR) 120 and phase-locked loop (PLL) circuits 130.

In one embodiment, integrated circuit device 100 may be an application specific integrated circuit (ASIC) device, an application standard specific product (ASSP) device, a programmable logic device (PLD) or a microprocessor device.

In general, the ASIC and ASSP devices may perform fixed and dedicated functions. The PLD devices may be programmable to perform a variety of functions. An example of a PLD device may be a field programmable gate array (FPGA) device. Microprocessor devices, coupled together with other devices (e.g., a memory device), may be used to perform instructions provided within a programming code.

Integrated circuit device 100 may be used in different types of high-speed systems. For example, integrated circuit device 100 may be used in a communication system such as a wireless communication system, a wired communication system, an optical communication system, and so forth. In one embodiment, integrated circuit device 100 may be a PLD that is used in a data center. Integrated circuit device 100 may also be a part of equipment for an optical transport network (OTN) system. Within the OTN system, integrated circuit device 100 may be used as a bridging device, an aggregation device and/or a switching device. It should be appreciated that data interfacing speed of integrated circuit device 100 for the respective OTN system may be, for example, 10 megabits per second (Mbps), 100 Mbps, 1000 Mbps, 10 gigabits per second (Gbps) and/or 100 Gbps, or higher in some cases.

In addition, integrated circuit device 100 may also control data transferring between different devices, for example, a microprocessor device and a memory device. Hence, integrated circuit device 100 may include circuits that may be used to implement various transmission standards that allow integrated circuit device 100 to communicate with external devices such as memory devices (not shown), which may be coupled to integrated circuit device 100.

Integrated circuit device 100 may include (or be configured to implement) different protocols circuitry. For example, integrated circuit device 100 may implement/include protocol circuitry based on the fiber channel protocol (FCP), infiniband (IB), and/or synchronous optical network (SONET).

Referring still to FIG. 1, transceiver circuits 120 occupies the peripheral portions of integrated circuit device 100, logic circuitry 110 occupies the center region of integrated circuit device 100 and PLL circuits 130 occupies the corner region of integrated circuit device 100. It should be appreciated that transceiver circuits 120, logic circuitry 110 and PLL circuits 130 on integrated circuit device 100 may be arranged differently that the one shown in the embodiment of FIG. 1. For example, logic circuitry 110, transceiver circuits 120 and PLL circuit 130 may be arranged in a column-based arrangement. The column-based arrangement may include strips of logic circuitry arranged together with strips of transceiver circuitry and PLL circuitry in a column formation.

In one embodiment, logic circuitry 110 may be used for performing core functions of integrated circuit device 100. Logic circuitry 110 may include specific circuitry for the functions that defines integrated circuit device 100. For example, logic circuitry 110 may include circuits to perform packet/data traffic management, packet processing, data aggregating and/or bridging connections between two devices.

In another example, logic circuitry 110 may include programmable logic elements when integrated circuit device 100 is a PLD. The programmable logic elements include circuits such as look-up tables, multiplexers, product-term logics, registers, memory elements and the like. The programmable logic elements may be programmed by a user (e.g., a designer or an engineer) to perform desired functions. In one embodiment, the programmable logic elements may be programmed to perform packet/data traffic management, packet processing, data aggregating and/or bridging connections between two devices.

Logic circuitry 110 may also include a processing circuit, in one embodiment. The processing circuit may be a hard processor circuit or a soft processor circuit. It should be appreciated that the hard processor circuit may be formed using standard cell structures whereas the soft processor circuit may be formed using the programmable logic elements. In one embodiment, the hard processor circuit may have its architecture similar to an ARM processor and the soft processor circuit may have its architecture similar to a NIOS processor.

In one embodiment, logic circuitry 110 may also include time division multiplexing (TDM) circuitry. The TDM circuitry may include a data link, two rotary multiplexer circuits, a memory circuit and multiple data channels. The data link may be coupled to one or more transceiver circuits 120. The TDM circuitry may receive an N-bit wide data in accordance to time division multiple access (TDMA) and outputs M-bit wide data through each of the N/M channels. The M-bit wide data may be transmitted sequentially (i.e., not according to the TDMA) through the N/M channels. It should be appreciated that the value of N/M is an integer number that is greater than 0.

In one embodiment, the value of N may be 320 and the value of M may be 32. Hence, 320-bit wide data received by the TDM circuitry may be distributed into ten 32-bit wide data with each 32-bit wide data being transmitted through their respective channel within the ten different channels. The 32-bit wide data may be transmitted out from TDM circuitry in the sequential manner (unlike in accordance to the TDMA).

In one embodiment, the TDM circuitry may only has N amount of routing interconnects between any two coupled circuits within the TDM circuitry. Hence, in one embodiment, there might only be 4×N amount of routings within the TDM circuitry (e.g., N amount of data links, N amount of routing interconnects between a rotary multiplexer and a memory circuit, N amount of routing interconnects between the other rotary multiplexer and the memory circuit, and N amount of channels). When the value of N is 320, there might only be 1280 routing interconnects within the TDM circuitry.

Transceiver circuits 120 may be used for transferring signals in to or out of integrated circuit device 100. For example, signals from logic circuitry 110 may be transferred out of integrated circuit device 100 through one of the transceiver circuits 120. Additionally, signals received from an external device (external to integrated circuit device 100) may be transferred to logic circuitry 110 through one of the transceiver circuits 120. In one embodiment, transceiver circuits 120 may be considered as external interfacing circuitry of integrated circuit device 100. Signals may be transferred out or received by one of the transceiver circuit 120 via its respective high speed serial interface (HSSI) pin (not shown). It should be appreciated that the signal transferred in to or out of transceiver circuits 120 may also be referred to as HSSI signals.

Each transceiver circuit 120 may include a receiver (RX) circuit and a transmitter (TX) circuit (both not shown). The receiver and transmitter circuits of a particular transceiver circuit 120 may facilitate the receiving and transmitting, respectively, of the HSSI signals. Each transceiver circuit 120 may be capable of transferring data at a particular speed. For example, transceiver circuits 120 may be able to transfer data at data rate of approximately 14 Gbps, 28 Gbps and/or 12 Gbps.

Integrated circuit device 100 may include one or more transceiver circuits 120. In one embodiment, integrated circuit device 100 may include approximately 48 transceiver circuits 120. In another embodiment, integrated circuit device 100 may include approximately 66 transceiver circuits 120.

Each transceiver circuit 120 may be capable of transferring data at an identical speed or at different speeds. For example, all transceiver circuit 120 transferring data at a data rate of approximately 14 Gbps only or 28 Gbps only. Additionally or alternatively, multiple transceiver circuits 120 may be transferring data at a data rate of 14 Gbps and a few of the transceiver circuits 120 may be capable of transferring data at a data rate of 28 Gbps. For example, integrated circuit device 100 may include four transceiver circuits 120 transferring data at a data rate of approximately 28 Gbps and thirty two transceiver circuits 120 may be transferring data at a data rate of approximately 12 Gbps.

In one embodiment, multiple transceiver circuits 120 may be used for transferring data at a data rate of approximately 100 Gbps. For example, ten transceiver circuits 120 transferring data at data rate of 10 Gbps may be used for transferring data at data rate of 100 Gbps. Additionally or alternatively, two transceiver circuits 120 transferring data at a data rate of 40 Gbps and two transceiver circuits 120 transferring data at data rate of 10 Gbps may also be collectively transferring data at a data rate of 100 Gbps.

Referring still to FIG. 1, each transceiver circuit 120 may be configurable to receive different protocol based HSSI signals. To enable such configurability on transceiver circuit 120, each transceiver circuit 120 may include a plurality of sub-circuits. For example, each transceiver circuit 120 may include a physical coding sublayer (PCS) circuit block and a physical medium attachment (PMA) circuit block (both circuit blocks are not shown in the embodiment of FIG. 1). The PMA circuit block may couples with external channels to generate a required clock signal, and may convert the data from a parallel form to a serial form or vice versa.

The PCS circuit block, on the other hand, is a digital processing logic formed between the PMA circuit block and logic circuitry 110. In one embodiment, the PCS circuit block may be configured to transmit/receive signals based on a peripheral component interconnect express (PCIe) Gen 3 standard or a 10G standard. In each of these circuit blocks (i.e., the PCS and PMA circuit blocks) may include multiple different sub-circuit blocks for transmitting and/or receiving signals.

Referring still to FIG. 1, integrated circuit device 100 includes multiple PLL circuits 130. PLL circuits 130 may generate an output signal that has its phase that is related to a phase of an input signal. In one embodiment, the input signal may be an external clock signal transmitted into integrated circuit device 100 from an external device (e.g., a client device). The output signal that is generated by PLL circuits 130 may be a reference clock signal. The reference clock signal may be transmitted to transceiver circuits 120 for the purpose of transmitting a HSSI signal out of integrated circuit device 100 or to retrieve information from a HSSI signal when received by integrated circuit device 100.

Figure 2:
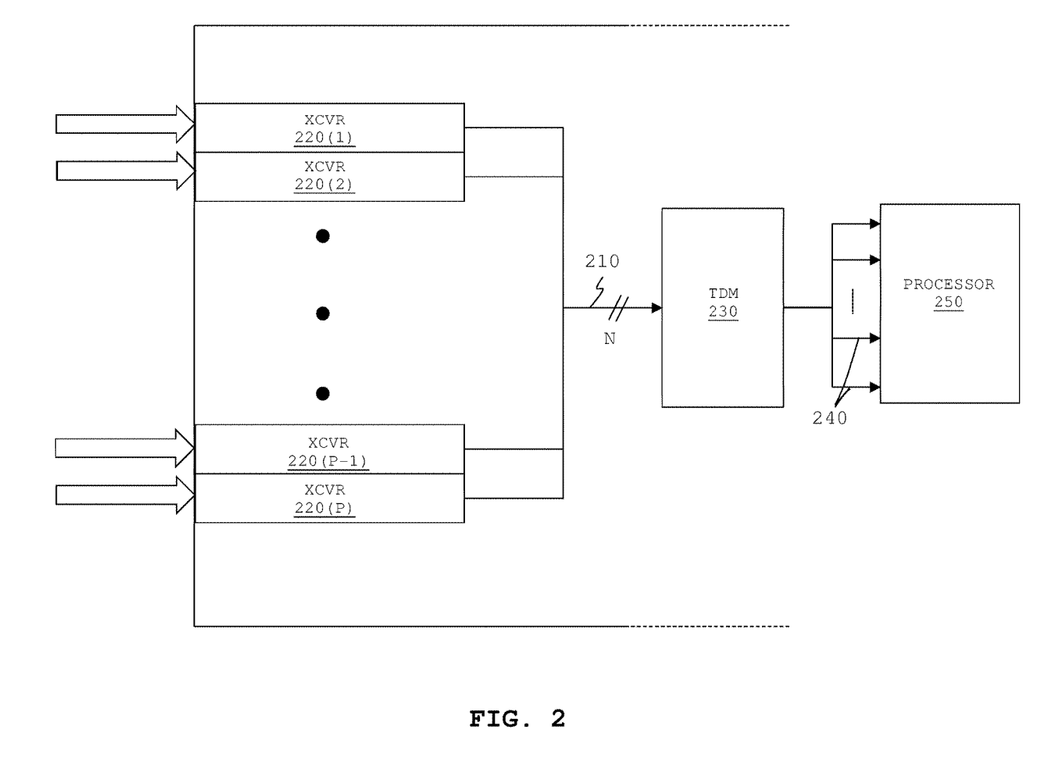
FIG. 2 shows an illustrative formation of N-bit wide data from multiple transceiver circuits in accordance with one embodiment of the present disclosure.

FIG. 2, meant to be illustrative and not limiting, illustrate formation of an N-bit wide data from multiple transceiver circuits in accordance with one embodiment of the present disclosure. It should be appreciated that the value of P may vary depending on an integrated circuit device.

Transceiver circuits 220(1)-220(P) may be similar to transceiver circuits 120 of FIG. 1, in one embodiment. Each transceiver circuit 220(1)-220(P) may include a PMA circuit and a PCS circuit. The PMA circuit may include a serializer/deserializer (SERDES) circuit whereas the PCS circuit may include block synchronizers, disparity checkers, descramblers, frame synchronizers, bit-error rate (BER) monitors, decoders and receive state machines (SMs), error checkers, clock data recovery (CDR) circuitry, and/or first-in first-out (FIFO) circuits (all not shown).

As described in the embodiment of FIG. 1, multiple transceiver circuits 220(1)-220(P) may collectively transfer data at a data rate of 100 Gbps (approximate values). For example, each transceiver circuit 220(1)-220(10) may be capable of transferring data at 10 Gbps when the value of P is 10. Therefore, these transceiver circuits 220(1)-220(10) collectively transfer data at 100 Gbps. Additionally or alternatively, two transceiver circuits (e.g., transceiver circuit 220(1) and transceiver circuit 220(2)) may transfer data at a data rate of 40 Gbps and whereas another two transceiver circuits (e.g., transceiver circuit 220(3) and transceiver circuit 220(4)) may transfer data at a data rate of 10 Gbps when the value of P is 4. Even in this situation, these transceiver circuits 220(1)-220(4) may collectively be transferring data at a data rate of 100 Gbps.

In general, the number of bits received from a particular transceiver circuit 220(1)-220(P) may be based on the relationship as shown in (1):

$$\text{Width} = \text{Rate}/\text{Freq} \tag{1}$$

Width=Number of bits received at each clock;
Rate=Data rate of transceiver circuit 220; and
Freq=Operating frequency of logic circuitry.

Therefore, in one embodiment, the number of bits received from each transceiver circuit 220(1)-220(P) that are operating at 10 Gbps may be 32 bits (provided that the internal operating frequency of logic circuitry is approximately 312.5 Megahertz (MHz)).

These data bits received from transceiver circuits 220(1)-220(P) may be aggregated into an N-bit wide data links 210. In one embodiment, the value of N may be 320. N-bit wide data links 210 may be a function of P. For example, N-bit wide data links 210 may be equivalent to a total number of data bits that are transferred at each clock cycle from transceiver circuits 220(1)-220(P).

The data may be aggregated using the TDMA approach. Taking an example whereby the value of N is 320 and the value of P is 10, transceiver circuits 220(1)-220(10) receiving data at identical data rates (e.g., 10 Gbps), the first 32-bit of data may be from transceiver circuit 220(1), a second 32-bit of data may be from transceiver circuit 220(2) and so on till a tenth 32-bit of data may be from transceiver circuit 220(10).

As shown in the embodiment of FIG. 2, TDM circuitry 230 may be coupled to multiple transceiver circuits 220(1)-220(P) through N-bit wide data links 210. Each of these bits (i.e., in total N-bit wide data) may be received by TDM circuitry 230 using the TDMA approach. In the example described above where N is 320, the 320-bit wide data may be received by TDM circuitry 230 using the TDMA approach. It should be appreciated that the TDMA approach is a channel access method that allows multiple users to share N-bit wide data links.

In one embodiment, TDM circuitry 230 may include two rotary multiplexer circuits and a memory circuit. TDM circuitry 230 receiving the N-bit wide data from transceiver circuits 220(1)-220(P) may be distributed into their respective channels 240. In one embodiment, the N-bit wide data received according to the TDMA approach by TDM circuitry 230 may be distributed through P amount of channels whereby each channel transfers M-bit wide data.

Hence, based on the example that was described above where N is 320 and P is 10, the first 32-bit data that is received in parallel at a first clock cycle may get fully transmitted out in sequential manner (i.e., one after another) through one of the channels 240 after 32 clock cycles. Similarly, the second 32-bit wide data that is received in parallel from transceiver circuit 220(2) may be transmitted out in sequential manner (i.e., one after another out) through another one of the channels 240 also after 32 clock cycles. This further applies in similar manner to the remainder of the bits within the N-bit wide data links 210.

In one embodiment, number of channels 240 may be similar to the value of P. Therefore each channel 240 may be transmitting M bits of data in a sequential manner and may fully transmit after M clock cycles.

Referring still to FIG. 2, channels 240 may be coupled to processor circuit 250. As described in the embodiment of FIG. 1, processor circuit 250 may be a hard processor circuit or a soft processor circuit. Each of the sequential M-bit wide data may be transmitted to process circuit 250.

Figure 3:
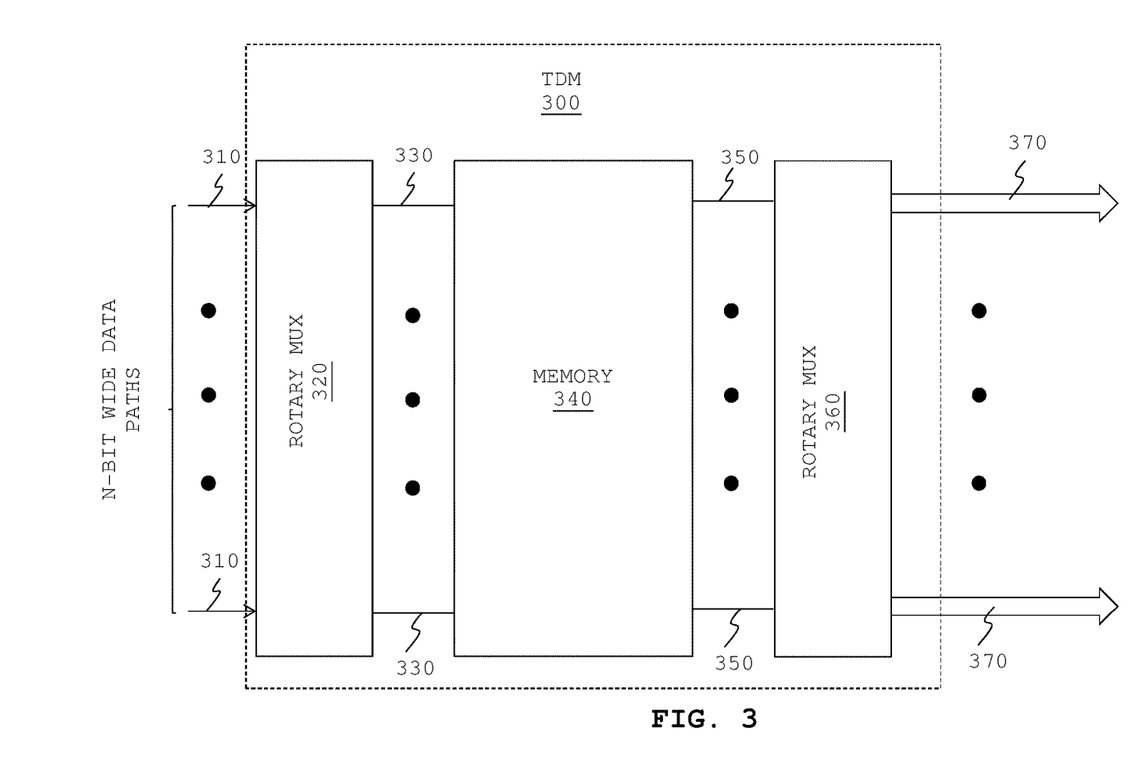
FIG. 3 shows an illustrative TDM circuitry in accordance with one embodiment of the present disclosure.

FIG. 3, meant to be illustrative and not limiting, illustrates a TDM circuitry in accordance with one embodiment of the present disclosure. TDM circuitry 300 may be similar to TDM circuitry 230 of FIG. 2, in one embodiment. As shown in the embodiment of FIG. 3, TDM circuitry 300 may include rotary multiplexer (mux) circuits 320 and 360 and memory circuit 340. TDM circuitry 300 receives data through data links 310 and outputs the rotated data through channels 370. The data bits received through data links 310 may be from one or more transceiver circuits (e.g., transceiver circuits 220(1)-220(P) of FIG. 2) and the data bits outputted from TDM circuitry 300 may be supplied to a processor circuit (e.g., processor circuit 250 of FIG. 2).

Referring still to FIG. 3, there are multiple data links 310 coupled to rotary multiplexer 320. In one embodiment, there may at least be N number of data links 310. Similarly, there may at least be N number of routings 330 between memory circuit 340 and rotary multiplexer 320, N number of routings 350 between memory circuit 340 and rotary multiplexer 360, and N number of channels 370 at output terminals of rotary multiplexer 360.

In one embodiment, rotary multiplexer 320 and 360 may be barrel shifter circuits. Still referring to FIG. 3, memory circuit 340 may have a storage capacity of at least 5 Megabits. Memory circuit 340 may be separated into different memory banks (in short referred to as banks) and within each bank includes multiple memory storage elements. Each memory storage element is addressable through an address. Therefore, addressing a single memory storage element may require information on the bank and the address in particular referring to the memory storage element.

In one embodiment, memory circuit 340 may have five banks. Each bank includes memory elements having addresses (in hexadecimal) that range from 0x0000 to 0xFFFF. Furthermore, memory circuit 340 may also include an address controller (not shown) that generates addresses to access (whether for reading/writing) the memory storage locations within memory circuit 340. In one embodiment, each of these memory elements within memory circuit 340 may be a dual-port memory element. Hence, the memory element is capable of reading and writing at a single instance.

In one embodiment, data links 310 may be transferring N-bit wide data. Based on the example provided in the embodiment of FIG. 2, the value of N may be 320. The N-bit wide data may be transferred based the TDMA approach. Data links 310 are coupled to rotary multiplexer circuit 320. Hence, at each clock cycle, M bits data may be received by rotary multiplexer circuit 320.

Data propagation from rotary multiplexer 320 to memory circuit 340 may best describe based on activities at different clock cycle instances. For example, at a first clock cycle, a first set of M bits may be received and be written onto input terminals of rotary multiplexer 320.

At a second clock cycle, the first set of M bits is stored in the memory elements within memory circuits 340. For example, the first set of M bits may be written to the memory elements having identical addresses but are located on different banks. At this instance, rotary multiplexer 320 may have a shifting factor of zero, and hence the writing to the memory elements in the memory circuit 340 may be direct (i.e., without rotation). For example, when the first set of M-bit wide data is a 4-bit wide data of "0001," this 4-bit wide data may be written on identical addressed memory elements located in different banks. The 4-bit wide data may be stored in a direct manner whereby the first bank stores "1," the second bank stores "0," the third bank stores "0," and the fourth bank stores "0." At the same instance, a second set of M bits may be read and written onto input terminal of rotary multiplexer 320.

At a third clock cycle, the second set of M bits may be written to identical addressed memory elements (however these memory elements are different than the one that stores the first set of M bits) located on different banks. At this instance, rotary multiplexer 320 may have a shifting factor of 1. Hence, the second set of M bits may be rotated before being written into their respective memory elements. For example, the second set of M-bit wide is a 4-bit wide data of "0001." The 4-bit wide data may be stored in such manner: the first bank stores "0," the second bank stores "0," the third bank stores "0," and the fourth bank stores "1."

At the same instance, a third set of M bits may be read and written into rotary multiplexer 320. The third set of M bits may be rotated by at least two bits before being written into the memory elements.

Such reading, rotating and writing into memory circuit 340 may continue for the remaining sets of the M bits that are received by rotary multiplexer 320. As shown in the embodiment of FIG. 3, memory circuit 340 is coupled to rotary multiplexer 360 through routing paths 350. Hence, at each clock cycle, memory circuit 340 may output at least M bits data may be received by rotary multiplexer circuit 360 depending on the addresses that are generated by the address controller (stated above).

Data propagation from memory circuit 340 to rotary multiplexer 360 may also be best described using activities occurring at different clock cycle instances. For example, at a first clock cycle, the address generator within memory circuit 340 may generate addresses of a first stored bit from the first bank within memory circuit 340, a second stored bit from the second bank within memory circuit 340, and so on till reading an M-th stored bit from the M-th bank within memory circuit 340.

At a subsequent clock cycle, address generator of memory circuit 340 may generate addresses of a second stored bit from the first bank within memory circuit 340, a third stored bit from the second bank within memory circuit 340, and so on till a first stored bit (resulting from a cyclic nature of memory addresses) from the M-th memory bank within memory circuit 340. Simultaneously, the first stored bit from the first memory bank, the second stored bit from the second memory bank, and so on till the M-th stored bit from the M-th memory bank may be written onto input terminals of rotary multiplexer 360.

At a subsequent clock cycle, the address generator of memory circuit 340 generates addresses of a third stored bit from the first bank within memory circuit 340, a fourth stored bit from the second bank within memory circuit 340, and so on till a second stored bit (again because of the cyclic nature of memory addresses) from the M-th memory bank within memory circuit 340. Simultaneously, the second stored bit from the first memory bank, the third stored bit from the second memory bank, and so on till the first stored bit from the M-th memory bank may be written onto the input terminals of rotary multiplexer 360. Furthermore, the first stored bit from the first bank, the second stored bit from the second bank, and so on till the M-th stored bit from the M-th bank may be rotated by a rotation factor of zero (i.e., no rotation) and outputted from rotary multiplexer 360 through different channels 370.

At a subsequent clock cycle, the address generator of memory circuit 340 generate addresses of a fourth stored bit from the first bank, a fifth stored bit from the second bank, and so on till a third stored bit from the M-th bank within memory circuit 340. Simultaneously, the third stored bit from the first bank, the fourth stored bit from the second bank, and so on till the second stored bit from the M-th bank may be written onto the input terminals of rotary multiplexer circuit 360. Furthermore, the second stored bit from the first bank, the third stored bit from the second bank, and so on till the first stored bit from the M-th bank may be outputted from rotary multiplexer 360 through different channels 370. In one embodiment, the data may be rotated by a rotation factor of one (i.e., one level of rotation) before being outputted to channels 370.

The reading and transmission by rotary multiplexer circuit 360 continues till all the stored data from memory circuit 340 gets transmitted through channels 370. These data may be transmitted to the remaining circuitry (e.g., processor circuit 250 of FIG. 2).

Figure 4:
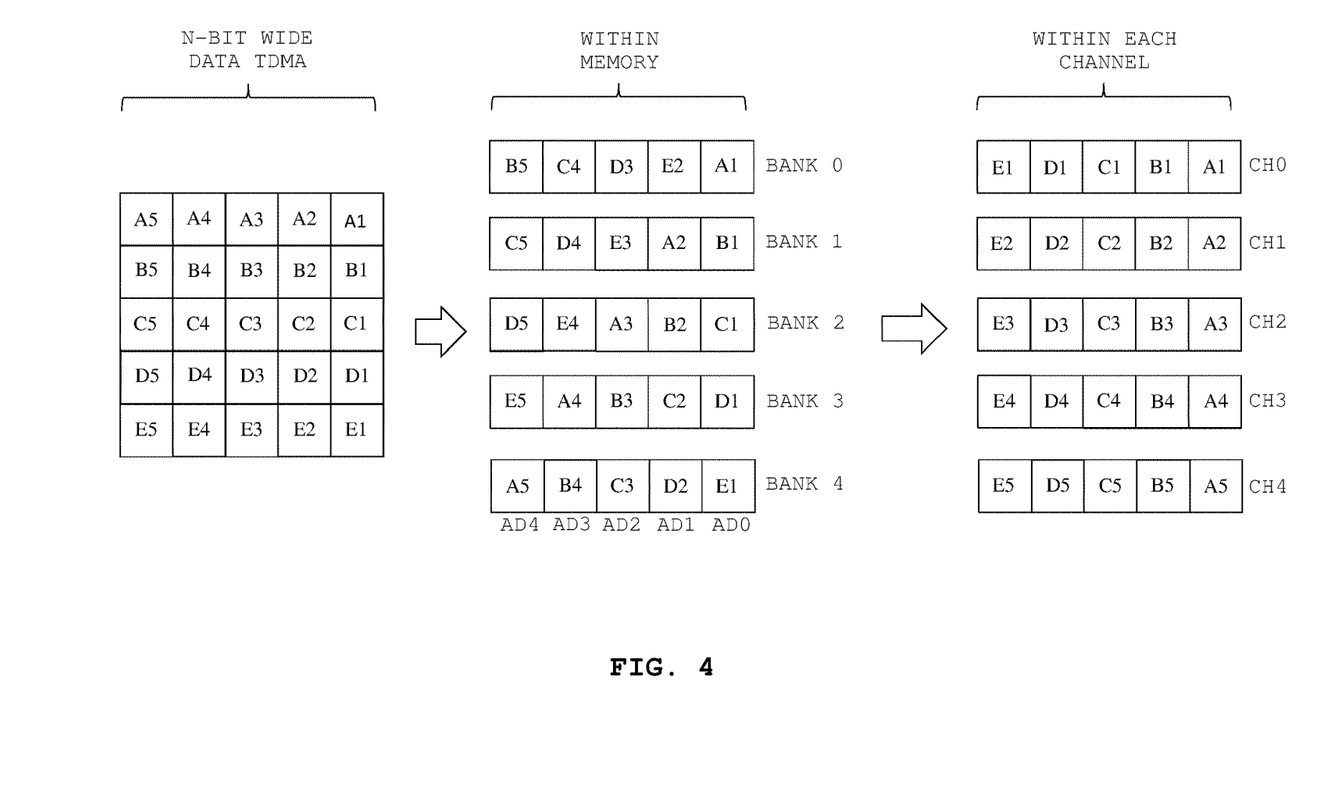
FIG. 4 shows an illustrative data flow through different circuits within the TDM circuitry in accordance with one embodiment of the present disclosure.

FIG. 4, meant to be illustrative and not limiting, illustrates data flow through a TDM circuitry in accordance with one embodiment of the present disclosure. In one embodiment, the TDM circuitry may be similar to TDM circuitry 300 of the embodiment of FIG. 3 or TDM circuitry 230 of FIG. 2.

As shown in the embodiment of FIG. 4, an N-bit wide data may be received through multiple data links. The N-bit wide data may be received using the TDMA approach. In FIG. 4, a first set of N/M-bit wide data that is received may be represented as A1, B1, C1, D1 and E1. A second set of N/M-bit wide data that is received may be represented as A2, B2, C2, D2 and E2. Subsequent sets of data that are received may be represented by A3, B3, C3, D3 and E3, followed by A4, B4, C4, D4 and E4, and finally A5, B5, C5, D5 and E5. It should be appreciated that the value of N may be at least 320 and the value of M may be 10, in one embodiment.

These bits may be rotated through a rotary multiplexer. In one embodiment, the rotary multiplexer may be similar to rotary multiplexer 320 of FIG. 3. The rotary multiplexer receives the N/M bits and rotates the N/M bits accordingly. The rotary multiplexer may then store the rotated data bits into a memory circuit (e.g., memory circuit 340 of FIG. 3). The manner in which the first set of the N/M bits are stored in the memory circuit is shown by the "within memory" portion of the embodiment of FIG. 4.

Referring still to FIG. 4, A1-E1 may be written into the memory elements having identical addresses (i.e., AD0) but different banks (i.e., A1 in BANK 0, B1 in BANK 1, C1 in BANK 2, D1 in BANK 3 and E1 in BANK 4) within the memory circuit. As for the second set of N/M bits (i.e., A2-E2) may be rotated and stored in also identical address memory elements (i.e., AD1) within different banks ((i.e., A2 in BANK 1, B2 in BANK 2, C2 in BANK 3, D2 in BANK 4 and E2 in BANK 1) within the memory circuit. The remaining sets of N/M bits may be received by rotary multiplexer gets rotated and stored into memory circuit as shown in the embodiment of FIG. 4.

Referring still to FIG. 4, the data bits may then be read from memory circuit based on the addresses generated by the address controller. Subsequently, the data bits that are read may be transmitted to another rotary multiplexer circuit (e.g., rotary multiplexer circuit 360 of FIG. 3). The data bits received by the rotary multiplexer circuit may be rotated and transferred through multiple channels (e.g., channels 370 of FIG. 3).

In one embodiment, at a first clock cycle, the address generator may generate addresses: AD0 of BANK 0, AD1 of BANK 1, AD2 of BANK 2, AD3 of BANK 3 and AD4 of BANK 4. At a second clock cycle, the address generator may generate addresses: AD0 of BANK 1, AD1 of BANK 2, AD2 of BANK 3, AD3 of BANK 4 and AD4 of BANK 0. The data bits from the addresses generated at the first clock cycle ((i.e., A0, A1, A2, A3 and A4) are transmitted to the rotary multiplexer circuit.

At a third clock cycle, the address generator may generate addresses: AD0 of BANK 2, AD1 of BANK 3, AD2 of BANK 4, AD3 of BANK 0 and AD4 of BANK 1. The data bits from the addresses generated at the second clock cycle ((i.e., B1, B2, B3, B4 and B0) are transmitted to the rotary multiplexer circuit. As the rotary multiplexer circuit is having a rotation of zero for data bit that was read at the first clock cycle, these data bits may be transferred to the channels without any rotation. For example, the data bits A0, A1, A2, A3 and A4 may be transferred to channels CH0, CH1, CH2, CH3 and CH4, respectively.

At a fourth clock cycle, the address generator may generate addresses: AD0 of BANK 3, AD1 of BANK 4, AD2 of BANK 0, AD3 of BANK 1 and AD4 of BANK 2. The data bits from the addresses generated at the third clock cycle ((i.e., C2, C3, C4, C0 and C1) are transmitted to the rotary multiplexer circuit. As the rotary multiplexer circuit is having a rotation of one for the data bits that were read at the second clock cycle, these data bits may be rotated from a sequence of B1, B2, B3, B4 and B0 to a sequence of B0, B1, B2, B3 and B4. Once rotated, these data bits are transferred to their respective channels. For example, the data bits B0, B1, B2, B3 and B4 may be transferred to channels CH0, CH1, CH2, CH3 and CH4, respectively.

At a fifth clock cycle, the address generator may generate addresses: AD0 of BANK 4, AD1 of BANK 0, AD2 of BANK 1, AD3 of BANK 2 and AD4 of BANK 3. The data bits from the addresses generated at the fourth clock cycle ((i.e., D3, D4, D0, D1 and D2) are transmitted to the rotary multiplexer circuit. As the rotary multiplexer circuit is having a rotation of two for the data bits that were read at the third clock cycle, these data bits may be rotated from a sequence of C2, C3, C4, C0 and C1 to a sequence of C0, C1, C2, C3 and C4. Once rotated, these data bits are transferred to their respective channels. For example, the data bits C0, C1, C2, C3 and C4 may be transferred to channels CH0, CH1, CH2, CH3 and CH4, respectively.

The data bits may be read transmitted by rotary multiplexer circuit till all the stored data from the memory circuit gets transmitted through their respective channels.

Figure 5:
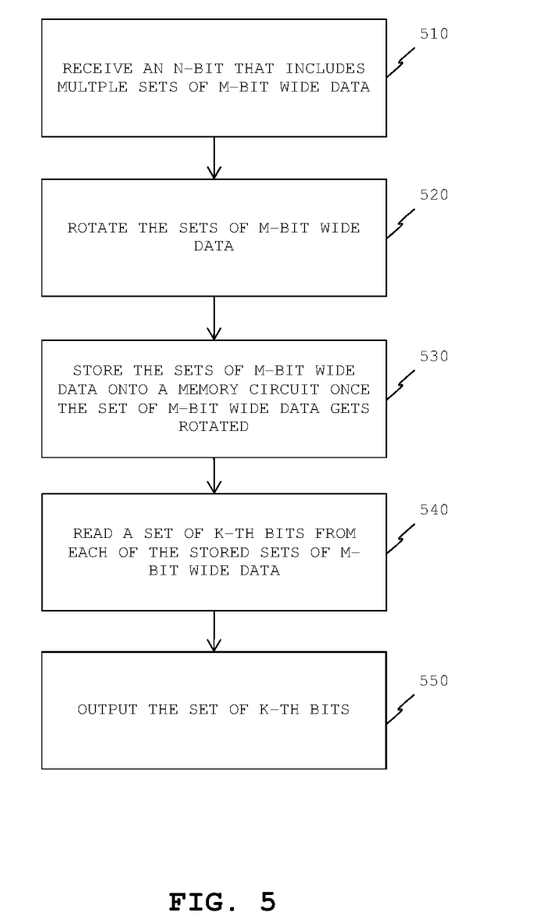
FIG. 5 shows a flowchart on a method of operating TDM circuitry in accordance with one embodiment of the present disclosure.

FIG. 5, meant to be illustrative and not limiting, illustrates a flowchart on a method of operating TDM circuitry in accordance with one embodiment of the present disclosure. The TDM circuitry may be similar to TDM circuitry 230 of FIG. 2 or TDM circuitry 300 of FIG. 3. At block 510, N-bit wide data is received by the TDM circuitry. The N-bit wide data may be transferred using a TDMA approach. In one embodiment, the N-bit wide data may be a 320-bit wide data. As stated in the embodiment of FIG. 2, the N-bit wide data is received from multiple transceivers. The N-bit wide data may be classified according to multiple sets of M-bit wide data. For example, a first set of M-bit wide data may include A1, B1, C1, D1 and E1. The second set of M-bit wide data may include A2, B2, C2, D2 and E2, and so on. In one embodiment, the M-bit wide data may be a 32-bit wide data. The purpose is to classify in such manner is that because only M-bit wide data may be rotated at any one time by a rotary multiplexer circuit. Therefore, there may be multiple M-bit wide data to form an N-bit wide data.

At block 520, each set of M-bit wide data may be rotated. The rotation may be performed by a rotary multiplexer (e.g., rotary multiplexer 320 of FIG. 3). As described in the embodiment of FIGS. 3 and 4, the first set of M-bit wide data may not be rotated, the second set of M-bit wide data may be rotated by a shifting factor of 1, the third set of M-bit wide data may be rotated by a shifting factor of 3, and so on.

At block 530, these rotated M-bit wide data are stored into a memory circuit. In one embodiment, the memory circuit may be similar to memory circuit 340 of FIG. 3. The manner in which the M-bit wide data may be stored within the memory circuit is similar to the description provided in FIGS. 3 and 4. For example, the M-bit wide data A1, B1, C1, D1 and E1 may be stored into identical addresses (i.e., AD0) but different banks (i.e., A1 in BANK 0, B1 in BANK 1, C1 in BANK 2, D1 in BANK 3 and E1 in BANK 4) within the memory circuit. As for the second set of M bits (i.e., A2,B2, C2, D2 and E2) may be stored in also identical address memory elements (i.e., AD1) within different banks ((i.e., A2 in BANK 1, B2 in BANK 2, C2 in BANK 3, D2 in BANK 4 and E2 in BANK 1) within the memory circuit.

At block 540, each set of k-th bit from the stored M-bit wide data is read and rotated. In one embodiment, the rotation may be performed by rotary multiplexer 360 of FIG. 3. The manner in which the k-th bit may be read and rotated is similar to the description provided in FIGS. 3 and 4. For example, the data bits that are read at a first instance may be A0, A1, A2, A3 and A4, the data bits that are read at second instance may be B1, B2, B3, B4 and B0, the data bits that are read at third instance may be C2, C3, C4, C0 and C1, and so on.

Once the data is read, these data bits are rotated. The data bits A0, A1, A2, A3 and A4 are not rotated as the shifting factor is 0. The data bits B1, B2, B3, B4 and B0 are rotated by a factor of 1, and therefore these data bits after rotation may be B0, B1, B2, B3 and B4. The data bits C2, C3, C4, C0 and C1 are rotated by a factor of 2, and therefore these data bits after rotation may be C0, C1, C2, C3 and C4. At block 550, these rotated data bits after performing block 540 may be outputted. In one embodiment, these rotated data bits may be outputted through channels 370 of FIG. 3.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the families of devices owned by Altera Corporation or Intel Corporation.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

Although the foregoing disclosure has been described in some detail for the purposes of clarity, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the appended claims.

The invention claimed is:

1. Time division multiplexing (TDM) circuitry, comprising:
 a first rotary multiplexer circuit configured to receive N-bit wide data in accordance to a time division multiple access (TDMA), wherein the N-bit wide data comprises multiple sets of M-bit wide data, and wherein the first rotary multiplexer circuit is configured to:
  receive a first set of M-bit wide data, a second set of M-bit wide data, and a third set of M-bit wide data of the multiple sets of M-bit wide data;
  rotate the second set of M-bit wide data by a first shifting factor to generate a corresponding second rotated set of M-bit wide data;
  rotate the third set of M-bit wide data by a second shifting factor to generate a corresponding third rotated set of M-bit wide data; and
 a memory circuit coupled to the first rotary multiplexer circuit, wherein the memory circuit is configured to store the first set of M-bit wide data, the second rotated set of M-bit wide data, and the third rotated set of M-bit wide data.

2. The TDM circuitry of claim 1, comprising:
a second rotary multiplexer circuit configured to read a set of bits from the memory circuit and output the set of the bits serially, wherein one or more bits within the set of the bits is k-th bits of each of the M-bit wide data, wherein k is an integer value greater than 0.

3. The TDM circuitry of claim 2, comprising:
a plurality of channels coupled to the second rotary multiplexer circuit, wherein each one of the plurality of the channels transmits one of the k-th bit outputted from the second rotary multiplexer circuit.

4. The TDM circuitry of claim 3, wherein the value of the N is 320 and the value of the M is 32.

5. The TDM circuitry of claim 3, wherein the memory circuit comprises:
a plurality of memory banks, wherein each memory bank comprises a plurality of memory elements addressable based on an identical range of addresses; and
an address controller to generate an address for addressing the plurality of the memory elements.

6. The TDM circuitry of claim 1, wherein each bit from the second rotated set of M-bit wide data is stored in the memory elements having identical addresses in a plurality of the memory banks.

7. The TDM circuitry of claim 2, wherein the second rotary multiplexer circuit is configured to rotate the sets of bits read from the memory circuit when the value of k is more than 1.

8. The TDM circuitry of claim 2, wherein the first and second rotary multiplexer circuits comprise barrel shifter circuits.

9. An integrated circuit device, comprising:
a plurality of transceiver circuits configured to receive data from an external integrated circuit device and generate N-bit wide data; and
time division multiplexing (TDM) circuitry configured to receive the N-bit wide data in accordance to time division multiple access (TDMA) and serially output an M-bit wide data, wherein the TDM circuitry comprises 4*N routings and a first rotary multiplexer circuit, wherein the first rotary multiplexer circuit is configured to:
receive a first set of the M-bit wide data, a second set of the M-bit wide data, and a third set of the M-bit wide data;
rotate the second set of the M-bit wide data by a first shifting factor to generate a corresponding second rotated set of the M-bit wide data;
rotate the third set of the M-bit wide data by a second shifting factor to generate a corresponding third rotated set of the M-bit wide data; and
a memory circuit coupled to the first rotary multiplexer circuit, wherein the memory circuit is configured to store the first set of the M-bit wide data, the second rotated set of the M-bit wide data, and the third rotated set of the M-bit wide data.

10. The integrated circuit of claim 9, comprising:
a processor circuit configured to couple to the TDM circuitry and process the M-bit wide data received from the TDM circuitry.

11. The integrated circuit device of claim 10, wherein the processor circuit comprises a processor architecture comprising Advanced RISC Machines (ARM) architecture or Nois architecture, or a combination thereof.

12. The integrated circuit device of claim 9, wherein each of the plurality of the transceiver circuits is configured to transfer data at approximately 10 gigabits/second (Gbps).

13. The integrated circuit device of claim 9, wherein the TDM circuitry comprises:
a second rotary multiplexer circuit configured to read a set of bits from the memory circuit and output the set of the bits serially, wherein the set of the bits includes k-th bits of each of the M-bit wide data, wherein k is an integer value greater than 0.

14. The integrated circuit device of claim 9, wherein value of the N is 320 and the TDM circuitry includes 1280 routings.

15. A method of operating time division multiplexing (TDM) circuitry, the method comprising:
receiving N-bit wide data in parallel from one or more transceiver circuits, wherein the N-bit wide data is separated into multiple sets of M-bit wide data;
using a first rotary multiplexer circuit to:
receive a first set of the M-bit wide data, a second set of the M-bit wide data, and a third set of the M-bit wide data of the multiple sets of the M-bit wide data;
rotate the second set of the M-bit wide data by a first shifting factor to generate a corresponding second rotated set of the M-bit wide data;
rotate the third set of the M-bit wide data by a second shifting factor to generate a corresponding third rotated set of the M-bit wide data; and
storing the first set of the M-bit wide data, the second rotated set of the M-bit wide data, and the third rotated set of the M-bit wide data.

16. The method of claim 15, comprising:
using a second rotary multiplexer circuit to read a set of k-th bits from each of the first set, the second rotated set, and the third rotated set of M-bit wide data, wherein the k is an integer and has a value more than 0; and
using the second rotary multiplexer circuit, outputting the set of k-th bits.

17. The method of claim 16, comprising:
when the value of k is more than 1, rotating the set of k-th bits; and
after rotating the set of k-th bits, outputting the set of k-th bits.

18. The method of claim 15, wherein a value of N is 320 and a value of M is 10.

19. The method of claim 15, wherein the first rotary multiplexer circuit comprises barrel shifter circuitry.

20. The method of claim 16, wherein the second rotary multiplexer circuit comprises barrel shifter circuitry.

* * * * *